United States Patent [19]

Nokubo et al.

[11] Patent Number: 5,026,123
[45] Date of Patent: Jun. 25, 1991

[54] FLOW CONTROL VALVE FOR ANTILOCK BRAKE CONTROL DEVICE

[75] Inventors: Seiji Nokubo; Teruhisa Kohno; Koichi Hashida; Takashi Usuki; Hideaki Higashimura, all of Itami, Japan

[73] Assignee: Sumitomo Electric Industries, Ltd., Osaka, Japan

[21] Appl. No.: 410,587

[22] Filed: Sep. 21, 1989

[30] Foreign Application Priority Data

Sep. 24, 1988 [JP] Japan .................. 63-239420

[51] Int. Cl.$^5$ .......................... B60T 8/48; B60T 13/70
[52] U.S. Cl. ............................ 303/117; 137/625.61; 303/116
[58] Field of Search ............... 303/115, 117, 113, 116, 303/119; 137/110, 625.61

[56] References Cited

U.S. PATENT DOCUMENTS 4,457,563  7/1984  Farr ........................... 303/115 X
4,715,666 12/1987  Farr ........................... 303/117 X

FOREIGN PATENT DOCUMENTS 49-28307  7/1974  Japan.
0960526   6/1964  United Kingdom ........... 303/115

Primary Examiner—Douglas C. Butler
Assistant Examiner—Alfred Muratori
Attorney, Agent, or Firm—Wenderoth, Lind & Ponack

[57] ABSTRACT

A flow control valve for use in an antilock control device includes a housing having inlet and outlet ports communicating with a pressure source and a wheel brake, respectively, and a spool slidably mounted in the housing and formed with a channel including an orifice. When the spool is in a first position, a large-flow passage is formed between the inlet and outlet ports. When in another position, a restricted-flow passage is formed between the inlet and outlet ports through the orifice while the large-flow passage is closed. A piston is mounted in the housing on top of the spool. Every time the brake is applied, the piston is adapted to move up and down, thus allowing the spool to slide in the same direction to the first position. Instead of the piston, a sleeve may be disposed between the inner periphery of the housing and the outer periphery of the spool so as to be slidable relative to both the housing and the spool. Every time the brake is applied, the sleeve is adapted to slide against the bias of a spring. In either arrangement, a relative movement takes place between the spool and the housing or the sleeve every time the brake is applied. This will prevent the spool from getting stuck between the first and second positions.

8 Claims, 4 Drawing Sheets

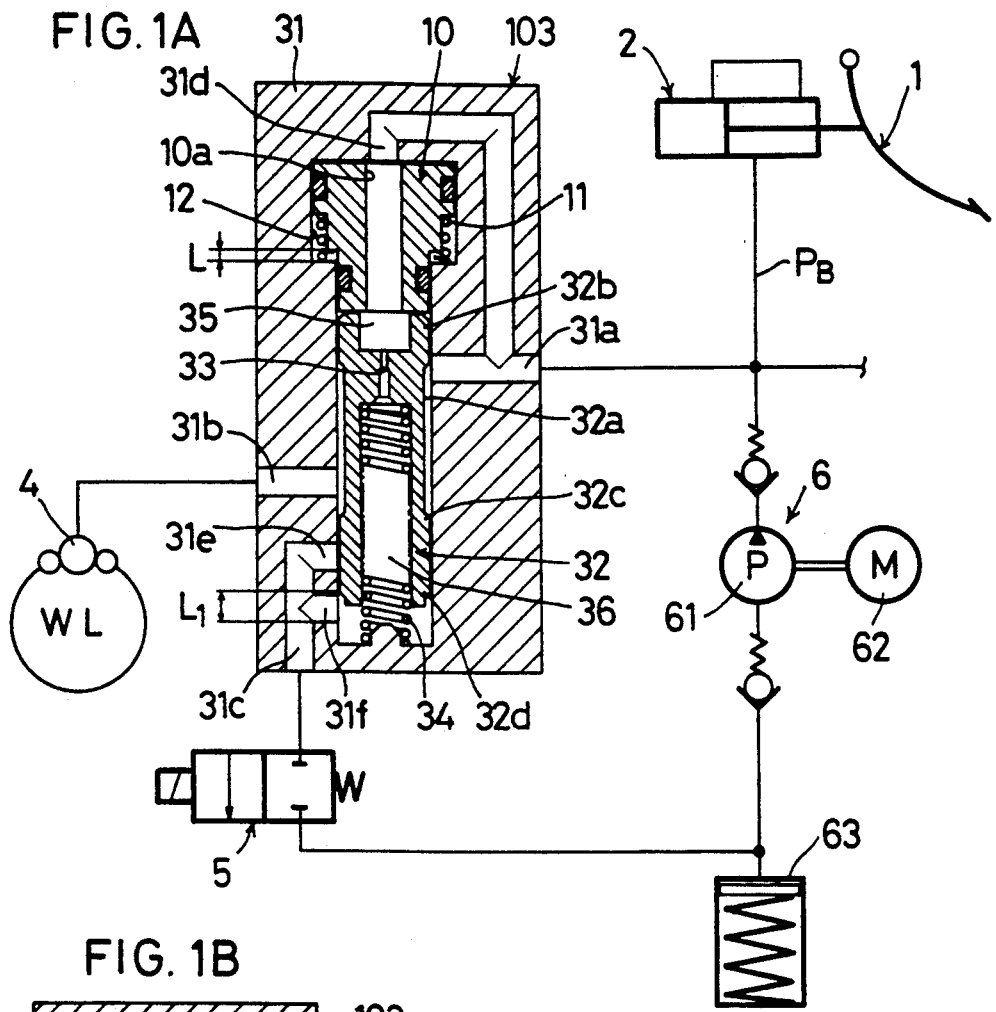
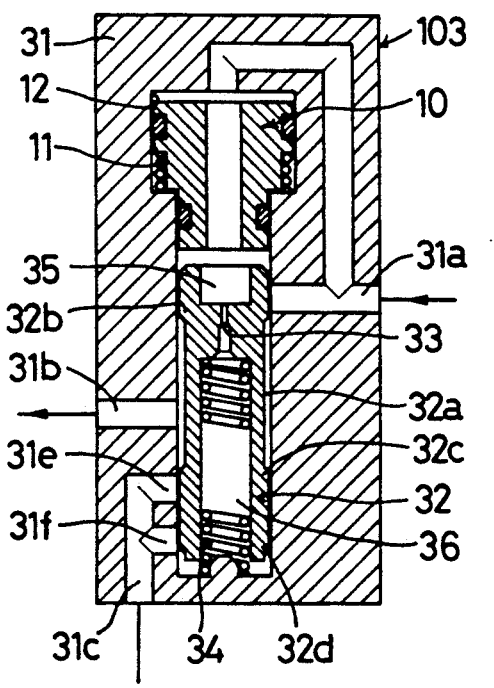
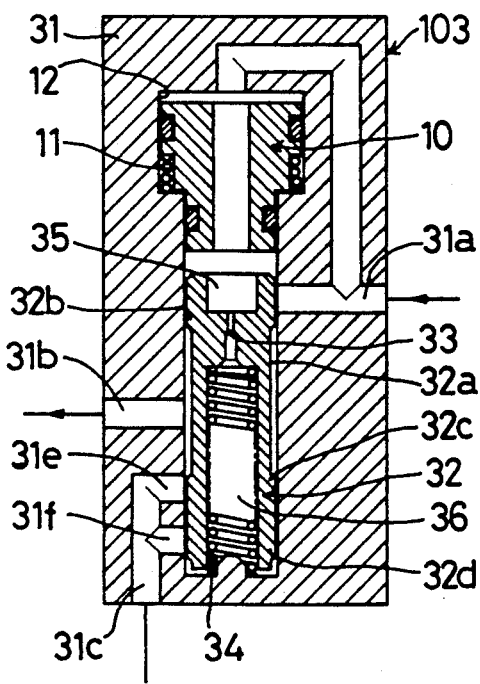

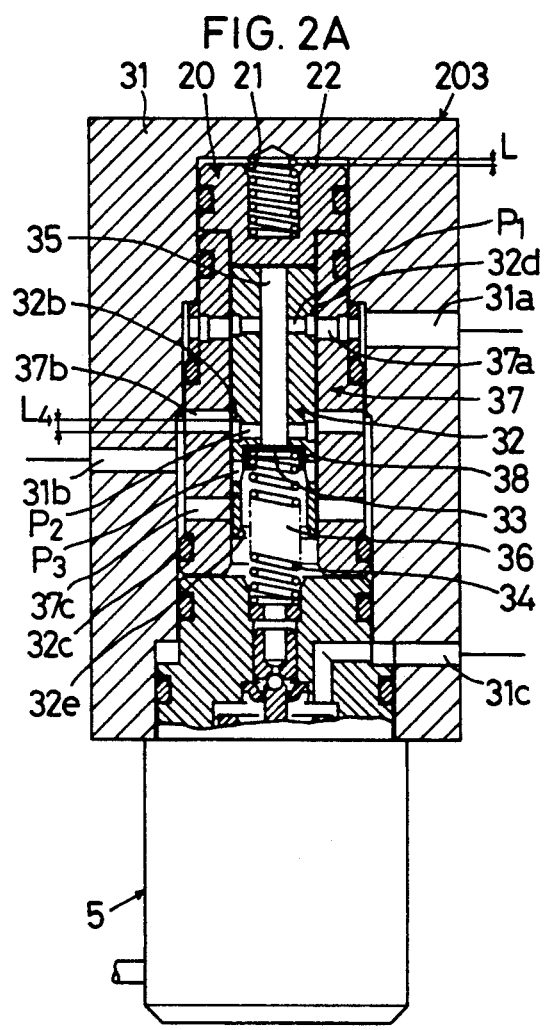
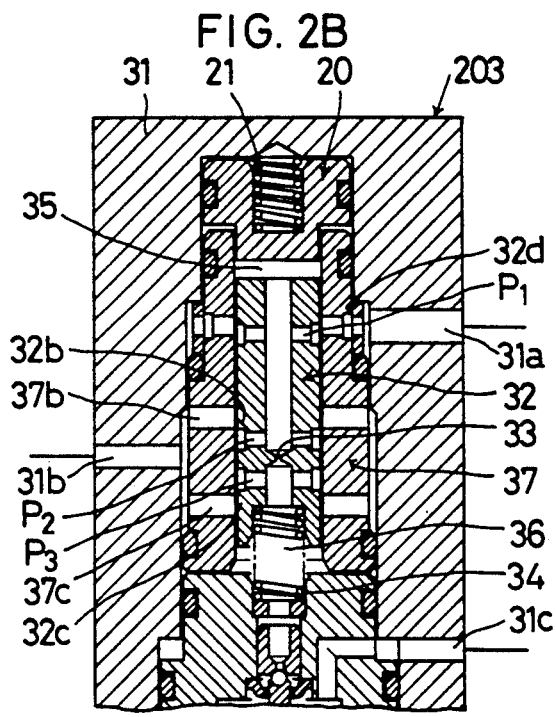
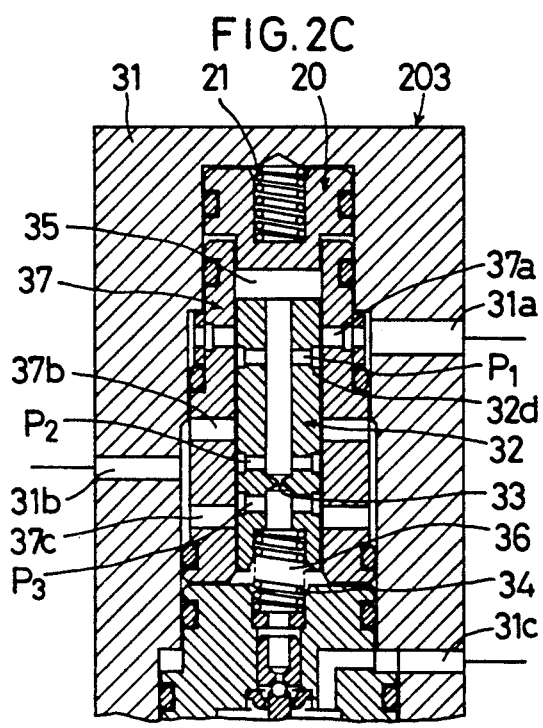

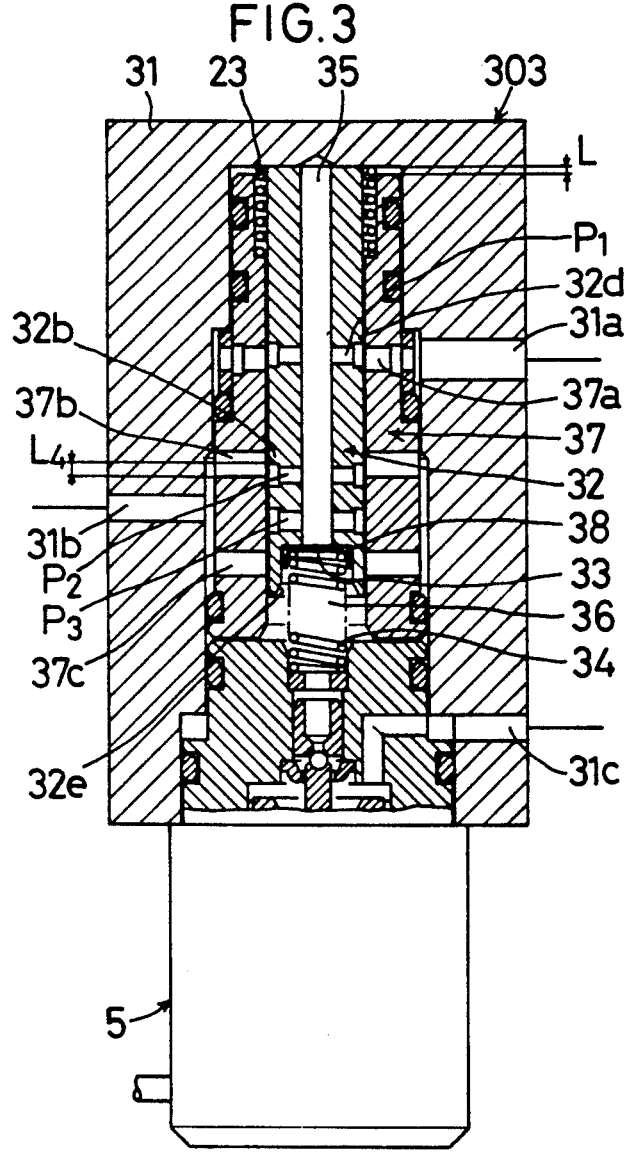

FLOW CONTROL VALVE FOR ANTILOCK BRAKE CONTROL DEVICE

BACKGROUND OF THE INVENTION

The present invention relates to a flow control valve for use in an antilock brake control device for a motor vehicle.

With the spread of antilock brake control devices for motor vehicles, it is becoming an urgent requirement to develop an antilock control device applicable to compact economy cars. To meet this requirement, it was proposed in GB 8512610 to use a single solenoid valve for each vehicle wheel and effect control with in two control modes, i.e. pressure reduction and slow pressure increase, instead of using two solenoid valves for each vehicle wheel as disclosed in Japanese Examined Patent Publication 49-28307.

The device disclosed in the former Publication is shown in FIGS. 4A, 4B and 4C in which a flow control valve 3 is employed to increase the braking pressure in a controlled manner in place of a solenoid valve as used in the latter Publication. This flow control valve 3 comprises a housing 31 formed with an inlet port 31a communicating with a master cylinder 2, an outlet port 31b communicating with a wheel brake 4 and a discharge port 31c communicating with a solenoid valve 5 serving as a discharge valve, and a spool 32 slidably mounted in the housing 31 and biased by a spring 34 to open and close the fluid communication among these ports.

When the valve 3 is in its original position shown in FIG. 4A, where the antilock control is not in action, a large-flow channel is formed extending from the inlet port 31a to the outlet port 31b through a peripheral groove 32a formed in the outer periphery of the spool 32. When the solenoid valve 5 is energized and opened to reduce pressure for effecting antilock control, hydraulic oil will be discharged through the discharge port 31c into a reservoir 63. This will move the spool 32 to the position shown in FIG. 4B owing to a difference in pressure at both ends thereof. In this state, the above-mentioned large-flow channel is closed by an edge 32b on the spool 32.

The spool 32 will further move to the position shown in FIG. 4C where part of the peripheral groove 32a at the side of an edge 32c opens to a passageway 31e. Thus a discharge channel is formed from the outlet port 31b to the discharge port 31c through the groove 32a and the passageway 31e, allowing hydraulic oil in the wheel brake 4 to be discharged into the reservoir 63 through the solenoid valve 5 to reduce the braking pressure. The hydraulic oil discharged is suctioned and pressurized by a pump 61 driven by a motor 62 so as to be returned to the line between the master cylinder 2 and the inlet port 31a.

When the solenoid valve 5 is deactivated in the state shown in FIG. 4C to increase the braking pressure again, the spool 32 will perform a metering of the oil at its edge 32d, forming a restricted-flow channel connecting the inlet port 31a with the outlet port 31b through a passage 31d, an orifice 33, a pressure reducing chamber 36, a passage 31f, the passage 31e and the peripheral groove 32a. The wheel braking pressure will rise slowly. When the pressure difference between the inlet port 31a and the outlet port 31b reduces to a certain level, the spool 32 will return to its original position shown in FIG. 4A.

This arrangement is economical because each wheel is controlled with a single solenoid valve. The opening of a passage between the metering edge 32d and the passage 31f (hereinafter referred to as variable-size orifice) changes so that the flow rate during the reapplication of pressure during the antilock control will be constant, determined by the pressure difference at both ends of the orifice 33, which is determined by the effective sectional area of the spool 32 and the biasing force of the spring 34. This will not only serve to keep constant the flow rate through the orifice irrespective of the pressure difference between the inlet port 31a and the outlet port 31b, but will also make it possible to reduce the flow rate through the orifice even if it has a rather large diameter because the pressure difference at both ends of the orifice 33 can be limited to a minimum. Thus this system can be advantageously applied to a compact car having a small-sized brake which requires a small amount of hydraulic oil.

With a flow control valve of the type in which the communications among a plurality of ports are changed over by moving a spool, it will become impossible to change over the communication if the spool should get stuck owing to rusting.

Though the spool can get stuck at any point within the range of its stroke, let us assume now that the spool 32 has become stuck in the position shown in FIG. 4A. In this state the pressure on the wheel brake can be controlled because the large-flow channel extending through the peripheral groove 32a remains open though the antilock control is deactivated.

But if the spool 32 should become get stuck in the position shown in FIG. 4B, where the communication between the inlet 31a and the outlet 31b as well as the communication between the outlet 31b and the discharge port 31c are shut off, the brake fluid from the pressure source can be sent to the outlet 31b only through clearance formed between the spool and the housing. This will extremely worsen the controllability of pressure on the wheel brake.

If the spool 32 should become stuck in the position shown in FIG. 4C, where only a restricted-flow channel remains open, not only will the variable-size orifice become unadjustable, but also the brake pressure has to be applied to the wheel brake through the restricted-flow channel even during the normal braking mode where the antilock control is out of action. This may retard the rising of braking pressure because the flow rate is restricted excessively. Although the spool will rarely get stuck in such a position in practice, it is necessary to take some measures against this problem in view of the fact that safety is the most important factor with wheel brakes.

SUMMARY OF THE INVENTION

It is an object of the present invention to provide a flow control valve which obviates the abovesaid shortcomings.

In accordance with the present invention, in a flow control valve for use in an antilock control device, comprising a housing having an inlet port communicating with a pressure source and an outlet port communicating with a wheel brake, a spool axially slidably mounted in the housing and formed with a fluid channel including an orifice, and a first biasing means for biasing the spool in one direction, the spool being adapted to form a large-flow passage connecting the inlet port and the outlet port together when it is in a first position and to form a restricted-flow passage extending from the inlet port to the outlet port through the orifice when it is in a second position, a slide means is mounted in the housing and is arranged in such a position as to receive the braking fluid pressure generated in the pressure source on at least one of both ends thereof, and a second biasing means is provided for biassing the slide means on the other end thereof. The slide means is adapted to slide axially against the biassing force of the second biassing means each time the brake is applied, the spool being adapted to move relative to the housing when the slide means slides axially against the biasing force of the second biasing means.

The movable body may be a piston mounted so as to abut the end of the spool opposite to its end pushed by the spring.

The movable body may be a sleeve in which the spool is slidably mounted.

Every time the brake is applied, the spool slidably mounted in the housing will move relative to the housing. This will prevent the spool from getting stuck to the housing owing to rusting, unless the brake is left unused for an unreasonably long period of time. Thus the control valve according to the present invention is free from such trouble as the loss of braking function, poor braking and the loss of antilock function.

BRIEF DESCRIPTION OF THE DRAWINGS

Other features and objects of the present invention will become apparent from the following description taken with reference to the accompanying drawings, in which:

FIG. 1A is a sectional view of the first embodiment of a flow control valve according to the present invention;

FIGS. 1B and 1C are sectional views of the same showing how the flow control valve operates while the antilock control is in action;

FIG. 2A is a sectional view of the second embodiment;

FIGS. 2B and 2C are sectional views of the same showing how the flow control valve of FIG. 2A operates;

FIG. 3 is a sectional view of the third embodiment;

DETAILED DESCRIPTION OF THE PREFERRED EMBODIMENT

Figure 4A:
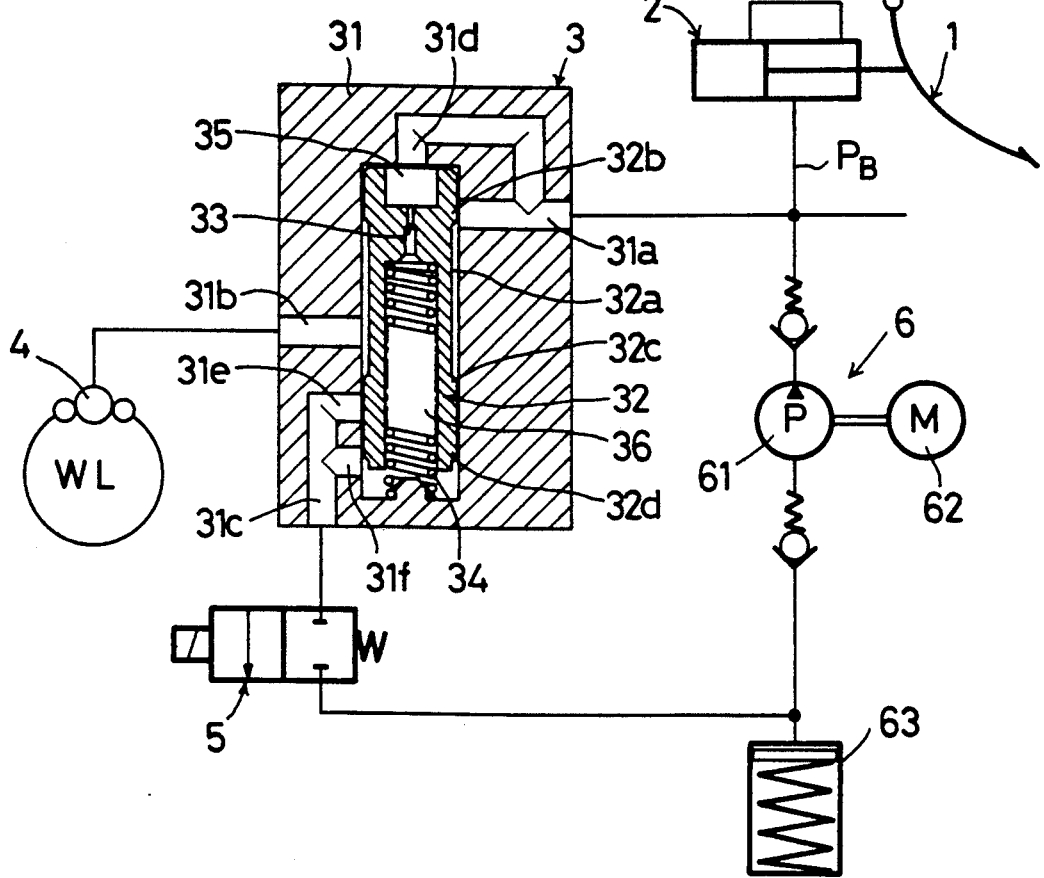
FIG. 4A is a sectional view of a prior art flow control valve.
Figure 4B:
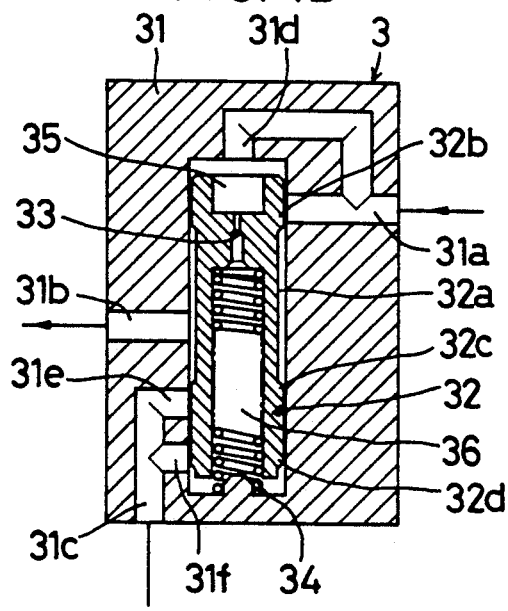
FIGS. 4B and 4C are sectional views of the same showing how the prior art flow control valve operates.
Figure 4C:
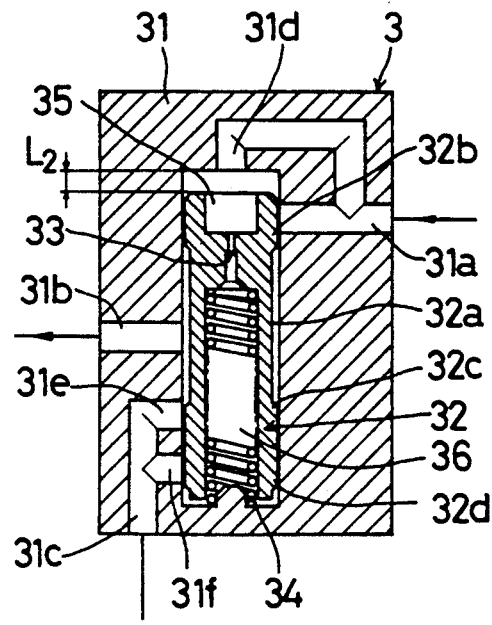

FIGS. 1A to 1C show a flow control valve 103 according to the first embodiment, which provides an improvement in the flow control valve shown in FIGS. 4A to 4C. Thus like parts are represented by like numerals.

In FIG. 1A, only one of the four lines for the four wheels of a motor vehicle is shown for convenience sake. The fluid pressure control system itself is identical to the conventional one. The braking pressure PB generated in a master cylinder 2 by treading the brake pedal 1 is applied to a wheel brake 4 through the flow control valve 103. When reducing the braking pressure, a solenoid valve 5 is opened to discharge the pressure oil acting on the wheel brake 4 through a discharge port 31c formed in the flow control valve 103 and back into a pressure source 6 comprising a pump 61, a motor 62 and a reservoir 63.

The flow control valve 103 comprises a housing 31 having its interior stepped to form a large-diameter chamber and a small-diameter chamber, a spool 32 slidably mounted in the small-diameter chamber, and a piston 10 having a small-diameter portion and a large-diameter portion. The small-diameter portion is fitted in the small-diameter chamber so as to abut the front end of the spool 32 with respect to the direction in which the spool 32 is biased by a spring 34. The large-diameter portion is fitted in the large-diameter chamber or piston chamber 12. The piston 10 is biased by a spring 11 in a direction away from the spool 32. The spring 11 serves to keep the piston 10 in the position shown in FIG. 1A in a non-braking condition. Upon an application of the brake, the piston 10 is adapted to move downwardly by the distance L owing to the pressure difference at both ends thereof produced as a result of braking, thus forcibly pushing the spool 32 downwardly toward a pressure reduction chamber 36 by the distance L. When the brake is released in this state, the piston 10 as well as the spool 32 will return to their original positions, biased by the respective springs 11 and 34.

The chambers defined at both end faces or pressure-receiving surfaces of the piston 10 communicate with each other through a passage 10a formed in the piston 10, so that the piston 10 normally receives the same fluid pressure at its small-diameter and large-diameter ends. In order to move the spool 32 without fail even during the non-antilock control, the difference in area between the pressure-receiving surfaces at both ends of the piston 10 should be determined so that the piston will begin to move against the biasing force of the spring 11 even when the braking pressure PB is relatively small.

The stroke L of the piston is determined so that when the piston 10 has moved downwardly by the distance L, the positional relationship between the ports formed in the spool 32 and the ports formed in the housing will be the same as shown in FIG. 4A. Therefore the stroke L1 of the spool 32 is expressed as $L1 = L + L2$ (in which L2 is the stroke of the spool in the prior art valve of FIG. 4C).

FIGS. 1B and 1C show the relative positions of ports which correspond to those shown in FIGS. 4B and 4C, respectively. Upon an appllication of the brake, the piston 10 will push the spool 32 to move it by the distance L from the position shown in FIG. 1A. Thereafter, the valve in this embodiment operates in the same manner as the valve shown in FIGS. 4A to 4C.

FIGS. 2A to 2C show the second embodiment in which the solenoid valve 5 is integral with a flow control valve 203 and the discharge channel is opened and closed at a portion between the pressure reduction chamber 36 and the discharge port 31c. For ease of manufacture, in the housing 31 is mounted a sleeve 37 formed with a port 37a communicating with the inlet 31a, and ports 37b and 37c communicating with the outlet 31b. In the sleeve 37 is slidably mounted a spool 32 formed with ports P1 and P2 adapted to bring the ports 37a and 37b into communication with each other through an input chamber 35, and with a port P3 adapted to bring the outlet 31b into communication with the pressure reduction chamber 36 through the port 37c.

A piston 20 is mounted in a piston chamber 22 formed in front of the sleeve 37 with its small-diameter end fitted in the sleeve 37 so as to abut the front end of the spool 32. A spring 21 is also mounted in the piston chamber 22 to urge the piston 20 toward the spool 32 with a larger biasing force than the spring 34. The spring 21 mounted in a space kept at atmospheric pressure serves to hold the spool 32 in the position shown in FIG. 2A while the brake is not applied.

Upon an application of the brake, the pressure oil will flow into the input chamber 35 to move the piston 20 in such a direction as to compress the spring 21. The spool 32 will move together with the piston 20 in the same direction by the same distance L against the biasing force of the spring 34. The stroke L of the piston should be shorter than the maximum stroke L4 between the upper edge of the port P2 and the lower edge of the port 37b in order to keep the inlet 31a and the outlet 31b in communication with each other even while the antilock control is out of action.

Upon an application of the brake, the piston 20 and the spool 32 will move upwardly by the distance L from the position shown in FIG. 2A to form a large-flow channel extending from the inlet 31a to the outlet 31b through port 37a, port P1, input chamber 35, port P2 and port 37b. When the solenoid valve 5 is energized and opened to start the antilock control, hydraulic oil in the pressure reduction chamber 36 will be discharged through the discharge port 31c, creating a pressure difference across an orifice 33 between the input chamber 35 and the pressure reduction chamber 36. Thus the spool 32 will move downwardly to shut off the large-flow channel with the edge 32b when the spool is in the position shown in FIG. 2B. When the spool 32 further moves down until the edge 32c opens port P3 to port 37c, a pressure reduction channel will be opened which extends from the outlet 31b through port 37c, port P3 and pressure reduction chamber 36 to the discharge port 31c, thus reducing the fluid pressure on the wheel brake.

The solenoid valve 5 will be deenergized to be closed when a command is given to increase the brake pressure again during the antilock control. The flow of hydraulic oil toward the discharge port 31c will be interrupted, whereas as shown in FIG. 2C a restricted-flow channel will be formed which extends from the inlet 31a to the outlet 31b through port 37a, a variable-size orifice formed by the port 37a and the metering edge 32d, port P1, input chamber 35, orifice 33, pressure reduction chamber 36, port P3 and port 37c.

The opening of the variable-size orifice is automatically adjusted so that the flow rate through the restricted-flow channel is kept constant irrespective of the difference between the pressure at the inlet 31a and that at the outlet 31b. As with the prior art shown in FIGS. 4A-4C, the flow rate is determined by the pressure difference at both ends of the orifice 33 which is in turn determined by the biasing force of the spring 34 and the effective sectional area of the spool 32. In this arrangement, since the variable-size orifice is located upstream of the orifice 33, the sleeve 37 can be directly connected at its open end to the solenoid valve 5. With this arrangement the valve can be positioned vertically, so that the air in the pressure reduction chamber can be expelled easily.

In the third embodiment shown in FIG. 3, a flow control valve 303 is provided with a sleeve 37 axially slidably mounted in the housing 31 and biased by a spring 23 toward the pressure reduction chamber 36. The sleeve 37 has a pressure-receiving surface at the side of the pressure reduction chamber 36 that is larger in area than that at the side of the input chamber 35. While the pressure reduction chamber 36 is out of communication with the discharge port, the pressures in the input chamber 35 and the pressure reduction chamber 36 will be kept equal owing to the fluid flow through the orifice 33. With this control valve, when the fluid pressure from the pressure source is introduced into the spool 32, the sleeve 37 will move upwardly by the distance L while compressing the spring 23 owing to the pressure difference at both ends thereof. The relation between the strokes L and L4 is expressed as L<L4. Otherwise this embodiment is the same as the second embodiment.

The orifice 33 shown in FIG. 2A and FIG. 3 is formed in a shim 38 urged by the spring 34 against a shoulder formed on the inner periphery of the spool 32. The shim 38 is adapted to move toward the pressure reduction chamber 36 against the biasing force of the spring 34 when the difference between the pressure in the pressure reduction chamber 36 and the pressure in the input chamber 35 becomes abnormally large. With this arrangement, though it is not essential to the present invention, if the orifice 33 should get clogged with foreign matter and the fluid flow from the input chamber 35 to the pressure reduction chamber is interrupted, the shim 38 will move toward the pressure reduction chamber 36 owing to the excessively large pressure difference, forming a bypass between the outer periphery of the shim 38 and a large-diameter edge 32e of the spool 32 to connect the input chamber 35 with the pressure reduction chamber 36. This will further improve the reliablility of the flow control valve according to the present invention.

In FIGS. 2B and 2C, a different shim than the one shown in FIG. 2A is shown. But, the function is substantially the same. Thus, they are treated as the same one embodiment.

In the preferred embodiments, the pressure reduction chamber 36 is opened and closed by use of the solenoid valve 5. But the flow control valve according to the present invention may be applied to a well-known mechanical antilock device in which the pressure reduction chamber 36 is opened and closed with a damping valve controlled by a sensor for sensing an angular velocity of the wheels.

What is claimed is:

1. An antilock control device for effecting an antilock control of a wheel brake, said device comprising: a source of pressure; and a flow control valve connected between said source of pressure and the wheel brake, said flow control valve having a housing defining an inlet port communicating with said pressure source and an outlet port communicating with the wheel brake, spool means axially slidably mounted in said housing and defining a fluid channel including an orifice therethrough for forming a large-flow passage connecting said inlet port and said outlet port together when the spool means is in a first position in said housing and for forming a restricted-flow passage extending from said inlet port to said outlet port through said orifice when the spool means is in a second position in said housing, first biasing means for exerting a biasing force that acts on an end of said spool means in one axial direction in said housing, slide means having opposite axial ends and mounted in said housing for receiving fluid pressure generated in said source of pressure on one of the ends thereof and for sliding axially relative to said housing, and second biasing means for biasing said slide means on the other end thereof; said slide means sliding axially against the biasing force of said second biasing means each time the brake is applied; and said spool moving relative to said housing when said slide means slides axially against the biasing force of said second biasing means.

2. An antilock control device as claimed in claim 1, when said slide means is a piston abutting said spool means on its end opposite to the end on which the biasing force of said first biasing means acts.

3. An antilock control device as claimed in claim 2, further comprising a sleeve fixedly mounted in said housing, said spool means and said piston being movable relative to said sleeve.

4. An antilock control device as claimed in claim 1 wherein said slide means is a sleeve mounted between the inner peripheral surface of said housing and the outer peripheral surface of said spool means so as to be slidable relative to said housing and said spool means.

5. A flow control valve for use in an antilock control device, said valve comprising: a housing defining an inlet port and an outlet port; spool means axially slidably mounted in said housing and defining a fluid channel including an orifice therethrough for forming a large-flow passage connecting said inlet port and said outlet port together when the spool means is in a first position in said housing and for forming a restricted flow passage extending from said inlet port to said outlet port through said orifice when the spool means is in a second position in said housing; first biasing means for exerting a biasing force that acts on an end of said spool means in one axial direction in said housing; slide means having first and second axially opposite ends and mounted in said housing for sliding axially relative to said housing; said second biasing means for biasing said slide means on the second end thereof; said spool means being movable relative to said housing when said slide means is slid axially against the biasing force of said second biasing means.

6. A flow control valve as claimed in claim 5, wherein said slide means is a piston abutting said spool means on its end opposite to the end on which the biasing force of said first biasing means acts.

7. A flow control valve as claimed in claim 6, further comprising a sleeve fixedly mounted in said housing, said spool means and said piston being movable relative to said sleeve.

8. A flow control valve as claimed in claim 5, wherein said slide means is a sleeve mounted between the inner peripheral surface of said housing and the outer peripheral surface of said spool means so as to be slidable relative to said housing and said spool means.

* * * * *